United States Patent [15] 3,668,096
Cook [45] June 6, 1972

[54] METHOD AND APPARATUS FOR CONTROLLING POLYMERIZATION REACTIONS

[72] Inventor: William H. Cook, Upper Montclair, N.J.
[73] Assignee: Monsanto Company, St. Louis, Mo.
[22] Filed: Nov. 13, 1968
[21] Appl. No.: 775,236

[52] U.S. Cl.............................204/165, 162/192, 204/168, 204/180 R
[51] Int. Cl.......................................................B01k 1/00
[58] Field of Search......................204/165, 168, 181, 180 R; 162/192

[56] References Cited

UNITED STATES PATENTS

| | | | |
|---|---|---|---|
| 3,321,391 | 5/1967 | Warfield et al. | 204/165 |
| 2,900,320 | 8/1959 | Metcalfe et al. | 204/300 |
| 3,497,419 | 2/1970 | Winer et al. | 162/192 |

Primary Examiner—John H. Mack
Assistant Examiner—Neil A. Kaplan
Attorney—John D. Upham and Joseph D. Kennedy

[57] ABSTRACT

A technique is disclosed for initiating and accelerating the reaction of polymerizable media, particularly thermosetting materials, through application of a suitably imposed electric field under conditions which lead to electrokinetic activity in filled systems. The process greatly facilitates the preparation of composites by permitting long gel time and rapid cure.

5 Claims, 1 Drawing Figure

PATENTED JUN 6 1972 3,668,096
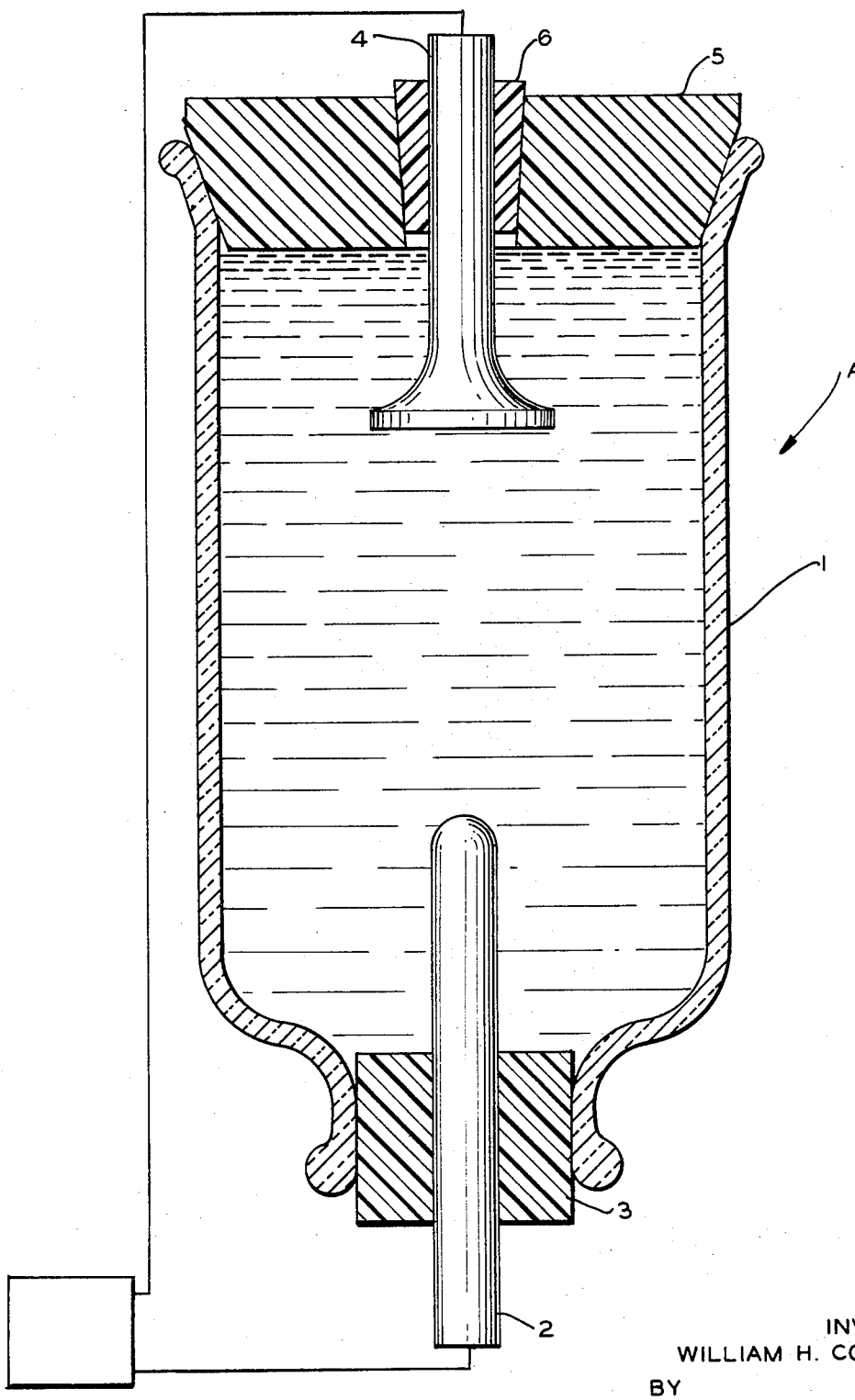
INVENTOR
WILLIAM H. COOK
BY
Robert J. Schaap
ATTORNEY

METHOD AND APPARATUS FOR CONTROLLING POLYMERIZATION REACTIONS

DISCLOSURE

This invention relates in general to certain new and useful improvements in initiating and accelerating polymerization reactions and more particularly to a method and apparatus for increasing the speed of polymerization in thermosetting polymer systems which are susceptible to the influence of electric fields.

High performance composites have received increasingly widespread acceptance as structural materials in recent years and there has been an increasing demand for more practical, economical methods for preparing such composites. Generally, these composites contain reinforcing fibers which are imbedded in a matrix system of thermosetting resin. After the fibers are oriented in a prescribed pattern, the curable system is hardened by polymerization. This has created a rather difficult problem for the chemist in the preparation of resin systems. It is desirable to achieve an infinite gel time to permit flexibility in positioning the fibers and shaping the prepreg and also an instant cure to lock the fiber in position. Unfortunately, gelation and final cure are simply successive stages in the same reaction mechanism. Achieving both characteristics in the same system would amount to a contradiction of a contradiction of the basic laws of chemical kinetics, and so searches for such systems have been in vain.

In spite of the difficulty, if not futility, of the search for a method of achieving such control by chemical means alone, the need for long gel times and rapid cures is increasing. With the introduction of widespread acceptance of high performance composites, the need for such a system has achieved great practical importance. It is rather surprising, therefore, that research efforts directed to this problem have not been expanded and that the literature reports only mechanistic approaches.

It is the primary object of the present invention to provide a means of initiating and accelerating the cure of polymerizable, relatively inviscid media by employment of electrical force fields.

It is a further object of the present invention to provide a mechanism for initiating and accelerating the cure of fiber-reinforced composites based on thermosetting matrices.

It is an additional object of the present invention to provide a method of achieving cures of polymerizable liquids which inherently reduces or eliminates the need for chemical accelerators.

It is also an object of the present invention to provide a process of the type stated which materially reduces raw material costs.

It is another salient object of the present invention to provide a method of the type stated and an apparatus for achieving uniform dispersion of particulate matter during polymerization reactions of a liquid until the viscosity thereof prevents settling of the particulate matter.

With the above and other objects in view, my invention resides in the novel features of form, construction, arrangement and combination of parts presently described and pointed out in the claims.

In the accompanying drawing:

The FIGURE is a schematic side elevational view of a reactor constructed in accordance with and embodying the present invention for achieving control of thermosetting matrix cures.

DEFINITIONS

Inasmuch as the application of electrical phenomena to controllably affect the behavior of polymerization rates is a relatively new field, it is necessary to establish the following definitions of terms employed herein.

Electrostatic Potential — The potential difference occurring in an electrical field at rest. Electrostatic effects or phenomena are the result of coulombic forces, as opposed to electromotive or electrokinetic forces. These effects are generally dominant in a gaseous medium and can be used to control movement of particulate matter in air as in electrostatic spray painting, fiber flocking, xerography, the electrostatic screen process printing.

Electrokinetic Potential — The potential difference occurring in an electrical field as a result of relative movement between a solid and a liquid at the solid/liquid interface, sometimes known as the zeta potential. Electrokinetic effects or phenomena accompanying this relative movement are (1) electroosmosis, i.e. movement of a liquid along a solid in an electric field; (2) electrophoresis or cataphoreses, i.e. movement of a solid suspended in a liquid in an electric field; (3) streaming potential, i.e. formation of a potential difference between the upstream and the downstream ends of a liquid vein streaming past a solid; and (4) sedimentation potential, i.e. formation of a potential difference between the top and the bottom of a vessel in which a solid powder suspended in a liquid gradually settles to the bottom.

Field of Force (Force Field) — A field or region of influence of electrical force where electrokinetic potential provides a significant contribution to the total force and oftentimes dominates the total force. While coulombic forces may be present, electrokinetic forces resulting from generation of a zeta potential are appreciable.

Entanglement — A condition where any fiber or particle in a matrix is not free to move in at least two dimensions. (It is to be noted that a fiber or particle which is freely movable in only one direction cannot be disentangled from a mass of fibers or particles if the fiber or particles are in the interior of the mass).

Dispersion — A suspension of particulate matter in a fluid media in which the fibers or particles are not restricted by other particulate matter, enabling the particulate matter to move freely in the medium.

Orientation — A condition of three dimensional positioning in prescribed locations.

Packing — The degree to which particulate matter fills a volume of space.

Mixing — The term "mixing" as employed herein is used in its generally established meaning in this particular art, i.e. a uniting or combining into a blend, or agglomerate or amalgamate so as to form a more or less homogeneous whole. This definition does not imply a complete loss of an element's identity and the elements such as fibrous material or particulate matter are distinguishing. The term "mixing" implies a state of commingling.

Aspect Ratio — A comparative term obtained by dividing the nominal length by the nominal diameter (cross section) of particulate matter. (The effectiveness of reinforcement in composite systems is directly dependent on the aspect ratio of the particulate matter used as filler).

Particulate Matter (Filler) — Minute parts of a solid of a size sufficient to exhibit the bulk physical and mechanical properties of the solid. "Particles" are defined as particulate matter having an aspect ratio of less than 5. "Fibers" are defined as particulate matter having an aspect ratio of at least 5. (In determining the aspect ratio of particles or fibers which have noncircular cross sections, the length of the fiber or particle is compared to the diameter of a circle having the same average circumference as the cross section of the fiber or particle.)

Whisker — A monocrystalline fiber.

Reinforcement — The term "reinforcement" as used herein refers primarily to the enhancement of the properties of an element in the mechanical or structural sense, such as an enhancement of strength, modulus, impact strength, creep resistance.

Coupler — An agent which will cause the surface of a reinforcing fiber to chemically bond to a matrix such as in the case of amino silanes.

Thermoplastic — A resinous plastic material which will flow without degradation under heat and pressure, such as polystyrene, polypropylene and polycarbonates, etc.

Thermoset — A resinous or plastic material which will not flow without degradation under conditions of heat and pressure, such as the phenolic, epoxy, polyester, and polyimide resins, etc.

DETAILED DESCRIPTION

Referring now in more detail and by reference characters to the drawing which illustrates a preferred embodiment of the present invention, "A" designates a reactor for controlling the rate of polymerization reactions and which generally comprises a reaction vessel 1. The vessel 1 can be constructed of any suitable dielectric material such as glass, quartz, or various plastic and synthetic resinous materials. The vessel may be opened at its upper end for the introduction of a dielectric liquid and particulate matter. A first electric conductor or electrode 2 is connected to the lower end of the reaction vessel 1 and extends therein in the manner as illustrated in the figure. This first electrode 2 may be sealed by a suitable liquid sealing ring 3. A second electrode 4 is secured to a cap 5 which is in turn removably disposed on the upper end of the reaction vessel 1. The cap 5 may be secured to the upper margin of the vessel 1 through a liquid-tight seal. The electrode 4 is secured to the cap 5 through a liquid-tight seal 6. Each of the electrodes 2,4 is in turn connected to a suitable source of electrical current (not shown).

The present invention is generally designed to achieve polymerization of liquid monomers or controlled cross-linking of low molecular weight polymers which are inviscid liquids or form relatively inviscid melts. It has been found that a strong electric field can be used to trigger very rapid cure of a normally unreactive or sluggish system. A thermosetting resin catalyzed with a very slow-acting catalyst to extend low temperature shelf life and obtain long gel times can be cured within a very few minutes by this system. In addition, complex shapes can be molded or laminated as desired without the normal restrictions imposed by rapid or premature gelation of a elation of a catalyzed resin. While the above system is generally useful for any type of polymerization reaction, it has found particular utility in the art of preparation of composites.

In my copending application, Ser. No. 775,242, filed Nov. 13, 1968, an apparatus and method for agitation and dispersion of particulate matter and of the orientation and packing of particulate matter in a liquid medium through the use of electrokinetic effects has been described. The reactions described in the aforementioned copending application are particularly adaptable for use in achieving the control of polymerization rates of the present invention. Through the use of these force fields, the composite can be rapidly and completely cured before fiber or filler misalignment or sedimentation occurs. This type of system eliminates the cost of expensive presses and molds. Furthermore, the cost of expensive catalyst/accelerator combinations can be reduced and resin systems not normally suitable for time consuming lay-ups can be used.

The reasons for the observed effects of an electric field on cure rate are not well understood. Researchers in the field have recently published observations that the rate and extent of vinyl polymerization can be increased by an electric field (Chemical & Engineering News, Feb. 28, 1956, page 37). However, it would be most surprising if the effects noted in vinyl systems are related to those occurring in the polymerization of a thermosetting resin such as an epoxy. For example, the above publication indicates that the effect being studied is unreliable in the presence of ionic impurities which are common constituents of epoxy resins.

The presence of ionic intermediates and impurities results in relatively high current flow and consequent Joule heating effects throughout the resin-catalyst solution. Joule heating, per se, is of relatively low order but is uniform throughout the system so that there are no areas which can act as heat sinks and reduce the overall effectiveness of the catalyst. The catalysts used are heat activated and the polymerization reaction itself is exothermic. The result is cumulative. The level of catalyst activity is increased, as initial low order polymerization generates more heat which reinforces the Joule effect and this, in turn, leads to the evolution of still more heat. Prepolymer molecules tend to be oriented when under the influence of an electric field. This condition leads to increased polymerization efficiency.

The use of the electric field appears applicable to a variety of thermosetting resins, including certain epoxies, epoxy novalacs, polyesters, phenolics and polyurethanes.

As indicated above, conventional techniques for laminating, winding, and molding composites having complex and intricate shapes require resin characteristics such as long gel time, thixotropic behavior, air, and moisture insensitivity, and others which are difficult or expensive to achieve due to the combinations of catalysts and accelerators required with many resin formulations. As a result, some of the resins of choice from the standpoint of structural properties are not normally used. The present invention makes employment of nearly any of these matrices straightforward.

Some of the filler materials which may be employed in the present invention are particles or fibers of either dielectric or electrically conductive materials. The alignment and packing of such particulate matter in the present invention is spectacular and, more importantly, offers a solution to alignment and packing problems in fabrication of fiber-reinforced composites. The forces arising from presence of the electrical fields of the present invention described in the aforementioned copending application, provide a unique way for packing and alignment without causing significant fiber damage. Some of the important prerequisites for rapid alignment and efficient close packing in the strong field regions of the system are: (1) the dielectric constant of the suspended fibers must be significantly greater than that of the liquid; (2) the applied electric field must be intense enough to cause agitation early in the reaction to disperse the fibers; and (3) electrokinetic flow of liquid in latter stages must be relatively low in order to prevent disruption of the fiber orientation and packing obtained. The filler material should preferably have a dielectric constant at least 1.5 times higher than the dielectric constant of the liquid.

For a particular system, the filler materials may be quartz and other forms of silica such as dehydrated silica sol, fume silica, silica gel, glass fibers, cristobalite, etc.; mineral silicates such as wollastonite, spodumene, mica, mullite, sillimanite, asbestos such as chrysotile and crocidolite, forsterite and hercynite; clays such as kaolinite, dickite, nacrite, beidellite, bentonite, hectorite, montmorillonite, nontronite, saponite, and attapulgite; metals such as iron, cobalt, nickel, aluminum, tin, lead, magnesium, calcium, strontium, barium, titanium, zirconium, vanadium, chromium, manganese, copper and zinc; the corresponding oxides of the above metals; and other organic and inorganic materials such as wood, wood flour, and heavy metal phosphates, sulfides, and sulfates.

The filler may be either granular or fibrous. Granular filled-prepolymer systems are more castable and moldable than prepolymer systems containing a corresponding amount of fibrous filler. However, with fibrous fillers much greater improvements are possible in structural properties such as compressive, tensile, flexure and shear strengths and moduli than with granular material. Fibrous reinforcement also provides greater improvement in dynamic mechanical properties, particularly impact resistance, toughness and creep, than does granular material. Filler systems can, therefore, be formulated to maximize the features desired for a particular final product.

Attachment or coupling of the filler to the cured polymer can be achieved by mere mechanical bonding due to physical forces or it can be chemically bonded to the polymer by the inclusion in the prepolymer system of a coupling agent which reacts with both filler and polymer to produce a chemical bond therebetween.

A prepolymer system can contain a quantity of orientable filler in combination with a quantity of unorientable reinforcing agent. Optimum ratios of polymer to unoriented reinforcing agent to oriented filler can provide castable or moldable compositions of very high strength, modulus, and impact resistance.

The quantity of filler which can be employed depends on several considerations such as the processability of the composite mix or fabricability of the final composite, the prepolymer system being utilized, the particle size and shape, the design of the mold, the type and strength of the force field, the specific gravity of the filler, and most importantly, the degree of reinforcement desired. Depending upon these and other factors, the filler may comprise from about 5 percent to about 95 percent by weight of the finished composition. A preferred range useful in achieving appreciable reinforcement by the practice of this method is from about 40 percent to about 90 percent by weight of the total composition. If reinforcement of the polymer is not one of the objectives of the filler orientation, a lower range of filler concentration from about 5 percent to about 50 percent by weight may be preferred.

Polymers useful in the present invention include those synthetic and natural resinous materials which are, or when heated, can become sufficiently fluid to permit movement of filler particles into an oriented position upon application of a force field to the filler-polymer mixture. Also included are those synthetic thermoplastic and thermosetting resins formed from monomers or prepolymers having a fluid viscosity in the range which permits movement of filler particles into an oriented position upon application of a force field to the filler-monomer or prepolymer mixture. Particularly preferred polymers are those which possess relatively high flexural and tensile strengths and moduli without reinforcement. Examples of such resins include the polyesters, polyamides, phenol-formaldehydes, epoxies and polycarbonates among others. Other resin systems, however, normally employed in applications where properties other than strength and rigidity are required, can find increased and expanded utility when filled or reinforced according to this invention. Examples of such polymers include the polyolefins, polyvinyl chloride, polyphenylenes and polyurethanes.

The size and shape of the electrode is dictated by the desired size and shape of the final product. The electrodes must be constructed of an electrically conductive material such as copper or stainless steel. However, the specific material employed will be determined by the system. The electrodes may be in direct contact with liquid or as a modification thereof, both of the electrode surfaces may be insulated by air, a vacuum or a solid dielectric from the liquid media. Power requirements will be increased, however, if the electrodes are insulated from the liquid.

As indicated above, the present invention achieves the unique result of accelerating the polymerization rate of the resin largely through use of electric fields under conditions which lead to electrokinetic activity in filled systems. Forces generated under these conditions can be used to orient and pack fibers in filled systems, as described in copending application, Ser. No. 775,242, filed Nov. 13, 1968.

EXAMPLES

The invention is further illustrated by but not limited to the following examples.

EXAMPLE 1

Rapid Cure of Resin Filled with Electrokinetically Oriented Flock

A ¼-inch deep layer of graphite-filled nylon flock ("Celusuede", fiber averaging 0.040 inch in length and 0.0007 inch in diameter) was placed in the bottom of a cylindrical glass electrolytic cell measuring 41 millimeters inside diameter with an electrode gap of 4 cm. The flock was then covered with a mixture of 37 g of epoxy resin, Epon 828, and 4.9 g of triethylene-tetramine. The cell was mounted vertically, the upper electrode assembly (anode) quickly put in place, and a D.C. potential of 23,000 volts applied. Agitation and mixing of the flock with the resin occurred immediately in spite of the high viscosity of the system. Within one minute the flock was uniformly dispersed and oriented vertically between the electrodes. The temperature at this point was 25° C. After 2 minutes the cell current began to rise and fluctuated between 0.2 and 0.8 milliamperes; the cell temperature rose to 35° C. After a total of 6.75 minutes current in the cell had reached 2–3 milliamperes and the temperature was between 260°–270° C. Voltage was removed and the cell was allowed to cool. The pale yellow resin casting was removed and sectioned to demonstrate alignment of the reinforcing flock. Normal gel time for the resin formulation at 25° C. is 30–60 minutes.

EXAMPLE 2

Preparation of a Filament Wound Tube

A filament wound preform was prepared by winding 13 layers of 20-end "E" glass roving saturated with a mixture of epoxy resin, Epon 828, with 14 phr metaphenylenediamine in a helical pattern over a thin copper tube (2 inches diameter) as a mandrel. The surface of the preform was wiped and then the preform was wrapped in aluminum foil which had been previously coated with a silicon release agent. The foil serving as a concentric electrode, was connected as the anode. The gap was approximately 0.035 inches between the electrodes. A D.C. potential of 6,000 volts was applied for 5 minutes. Temperature of the curing composite rose high enough that the odor of the curing agent was readily detectable. Current was discontinued and the composite was allowed to cool. Shear strength of the off-white tube was 7,920 psi. Specific gravity was 2.15 g/cc. Dielectric constant of the composite was 3.9 at $10^3$ cps at 23° C.

EXAMPLE 3

Preparation of a Fabric Laminate

A prepreg of 2 layers of 181 glass fabric with A-1100 finish impregnated with U.S. Polymeric Chemicals' phenolic resin F-501 was hand laid on a male copper mold fashioned in the shape of a blunt-ended anode (approximate dimensions were 1 inch in height 21.7 inches in circumference, 4.5 inches blunt faces). The prepreg was vacuum bagged and then covered with a thin copper foil anode which allowed a total anode mold gap of approximately 0.250 inches. A D.C. potential of 41,000 volts was applied for 3 minutes, the composite was allowed to cool, and the anode and vacuum bag were removed. Sections cut from the tan composite exhibited a flexural strength of 67,000 psi, a flexural modulus of $3.8 \times 10^6$ psi, and a specific gravity of 1.8 g/cc.

EXAMPLE 4

Pultrusion of Glass Filament Reinforced Rod

A pultrusion apparatus was set using electrodes as the molding dies. The electrodes measuring 6 inches in length, were machined to give the desired orifice shape and were separated by ceramic plates 0.10 inch thick. A bundle of glass roving made up of 60 strands of 60-end "E" glass roving (epoxy compatible) impregnated with a mixture of epoxy resin, Epon 815, with 90 phr nadic methyl anhydride curing agent was introduced from the creel through the dies to the take-up rolls. A D.C. potential of 33,000 volts was applied across the electrodes and advance of the filament bundle through the apparatus was started. At a take-up rate of 1 foot per minute, shaped rod was produced within 4 minutes of application of voltage. The rod was well formed and quite stiff. It was cut into 3 inch sections and postcured for 5 hours at 150° C. Normal gelation time of the matrix resin at 120° C. is 1–2 hours. Tensile strength of the rod was 156,000 psi; specific gravity was 2.15 g/cc.

Having thus described my invention, I claim and desire to secure by Letters Patent the following:

1. A process for preparing a reinforced polymeric composition comprising
   a. mixing together a filler or fiber and a polymerizable, relatively inviscid, non-conductive liquid or melt, said filler or fiber having a dielectric constant at least 1.5 times greater than the dielectric constant of said liquid or melt,
   b. applying across said liquid or melt an electric field of sufficient magnitude to cause orientation and dispersion of said filler or fiber in said liquid or melt before the polymerization of said liquid or melt, and
   c. polymerizing said liquid or melt while said filler or fiber is in an oriented and dispersed condition, thereby eliminating filler or fiber misalignment or sedimentation.

2. A process according to claim 1, wherein a fiber is mixed with said liquid or melt and wherein substantially all of the fibers have their major axes aligned by said electric field prior to the polymerization of said liquid or melt.

3. A process according to claim 1, wherein the application of said electric field to said liquid or melt causes an increase in the rate of polymerization of said liquid or melt by comparison to the rate of polymerization observable when no electric field is applied.

4. A process according to claim 1, wherein a polymerizable, relatively inviscid, non-conductive thermosetting resinous liquid is employed.

5. A process according to claim 4, wherein the polymerizing of said thermosetting resinous liquid is characterized by a long gel time and rapid cure.

* * * * *